US011138890B2

(12) United States Patent
Briggs et al.

(10) Patent No.: US 11,138,890 B2
(45) Date of Patent: Oct. 5, 2021

(54) SECURE ACCESS FOR DRONE PACKAGE DELIVERY

(71) Applicant: INTERNATIONAL BUSINESS MACHINES CORPORATION, Armonk, NY (US)

(72) Inventors: Benjamin D. Briggs, Waterford, NY (US); Lawrence A. Clevenger, Rhinebeck, NY (US); Leigh Anne H. Clevenger, Rhinebeck, NY (US); Christopher J. Penny, Saratoga Springs, NY (US); Michael Rizzolo, Albany, NY (US); Aldis Sipolins, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 15/825,669

(22) Filed: Nov. 29, 2017

(65) Prior Publication Data
US 2019/0164441 A1 May 30, 2019

(51) Int. Cl.
| | | |
|---|---|---|
| *G08G 5/00* | (2006.01) | |
| *B64C 39/02* | (2006.01) | |
| *G05D 1/10* | (2006.01) | |
| *G06Q 10/08* | (2012.01) | |
| *G05D 1/00* | (2006.01) | |

(52) U.S. Cl.
CPC ......... *G08G 5/0069* (2013.01); *B64C 39/024* (2013.01); *G05D 1/0022* (2013.01); *G05D 1/101* (2013.01); *G06Q 10/0833* (2013.01); *B64C 2201/127* (2013.01); *B64C 2201/128* (2013.01)

(58) Field of Classification Search
USPC .............................................................. 701/2
See application file for complete search history.

(56) References Cited

U.S. PATENT DOCUMENTS

| | | |
|---|---|---|
| 9,244,147 B1 | 1/2016 | Soundararajan et al. |
| 9,534,905 B1 | 1/2017 | Bostick et al. |
| 9,536,216 B1 | 1/2017 | Lisso |
| 9,714,089 B1 * | 7/2017 | Louw .................... B64C 39/024 |
| 10,067,503 B2 * | 9/2018 | Li .......................... B64C 39/024 |

(Continued)

FOREIGN PATENT DOCUMENTS

| | | | |
|---|---|---|---|
| CA | 2956807 A1 * | 7/2014 | |
| WO | WO-2018006096 A1 * | 1/2018 | ............ H04L 63/08 |

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Jean Paul Cass
(74) *Attorney, Agent, or Firm* — Dmitry Paskalov (57) ABSTRACT

The present invention may receive a plurality of unlock instructions based on determining a location is secured from access by the drone. The present invention may use the plurality of received unlock instructions to access the location with an access device while determining the drone is present at the drop off location. The present invention may use the plurality of received unlock instructions to re-secure the location with the access device when determining successful delivery of a package by the drone, and may monitor a security of the location.

6 Claims, 5 Drawing Sheets

(56) References Cited

U.S. PATENT DOCUMENTS

| | | | | |
|---|---|---|---|---|
| 2003/0004814 A1* | 1/2003 | Roseen | ............... | G07G 1/0036 |
| | | | | 705/22 |
| 2006/0069463 A1* | 3/2006 | Kim | ............... | G08B 13/1966 |
| | | | | 700/245 |
| 2013/0268165 A1* | 10/2013 | Hashima | ............... | A01D 34/80 |
| | | | | 701/50 |
| 2013/0276751 A1* | 10/2013 | Raasch | ............... | F02M 19/12 |
| | | | | 123/352 |
| 2013/0343906 A1* | 12/2013 | Funke | ............... | A01D 34/006 |
| | | | | 417/10 |
| 2014/0254896 A1 | 9/2014 | Zhou et al. | | |
| 2014/0266585 A1 | 9/2014 | Chao et al. | | |
| 2015/0109104 A1* | 4/2015 | Fadell | ............... | H04L 67/12 |
| | | | | 340/5.65 |
| 2015/0109112 A1* | 4/2015 | Fadell | ............... | G08B 19/005 |
| | | | | 340/328 |
| 2015/0109128 A1* | 4/2015 | Fadell | ............... | G08B 3/10 |
| | | | | 340/540 |
| 2015/0112885 A1* | 4/2015 | Fadell | ............... | G08B 25/008 |
| | | | | 705/330 |
| 2015/0116106 A1* | 4/2015 | Fadell | ............... | G08B 19/005 |
| | | | | 340/501 |
| 2015/0116107 A1* | 4/2015 | Fadell | ............... | G08B 27/003 |
| | | | | 340/501 |
| 2015/0116108 A1* | 4/2015 | Fadell | ............... | G06Q 10/083 |
| | | | | 340/501 |
| 2015/0116109 A1* | 4/2015 | Fadell | ............... | G08B 19/005 |
| | | | | 340/501 |
| 2015/0120015 A1* | 4/2015 | Fadell | ............... | G06Q 10/0631 |
| | | | | 700/90 |
| 2015/0120094 A1 | 4/2015 | Kimchi et al. | | |
| 2015/0120596 A1* | 4/2015 | Fadell | ............... | G06Q 10/0631 |
| | | | | 705/330 |
| 2015/0120598 A1* | 4/2015 | Fadell | ............... | G06Q 10/0631 |
| | | | | 705/333 |
| 2015/0127712 A1* | 5/2015 | Fadell | ............... | G08B 25/008 |
| | | | | 709/202 |
| 2015/0145643 A1* | 5/2015 | Fadell | ............... | G08B 27/003 |
| | | | | 340/5.51 |
| 2015/0154850 A1* | 6/2015 | Fadell | ............... | G08B 29/185 |
| | | | | 340/501 |
| 2015/0156030 A1* | 6/2015 | Fadell | ............... | G06Q 10/063 |
| | | | | 700/90 |
| 2015/0156031 A1* | 6/2015 | Fadell | ............... | G08B 19/005 |
| | | | | 700/276 |
| 2016/0033966 A1 | 2/2016 | Farris et al. | | |
| 2016/0107749 A1* | 4/2016 | Mucci | ............... | G08B 29/185 |
| | | | | 701/3 |
| 2017/0091710 A1* | 3/2017 | Van Dyke | ............... | H04L 67/42 |
| 2019/0259232 A1* | 8/2019 | Nandakumar | ............... | G07F 17/10 |
| 2020/0301448 A1* | 9/2020 | Di Benedetto | ............... | G05D 1/0088 |

OTHER PUBLICATIONS

Chronicled, "Trusted Internet of Things and Smart Supply Chain Solutions—Secure identities, trusted IoT data, and automated business logic" https://www.chronicled.com/, accessed on Nov. 9, 2017, pp. 1-4.

Etherington, "Amazon could be working on in-home package deliveries", TechCrunch, https://techcrunch.com/2016/09/27/amazon-could-be-working-on-in-home-package-deliveries/, accessed on Nov. 9, 2017, pp. 1-2.

Trackpin, "Access Control Systems", http://trackpin.com/, accessed on Nov. 9, 2017, pp. 1-5.

* cited by examiner

SECURE ACCESS FOR DRONE PACKAGE DELIVERY

BACKGROUND

The present invention relates, generally, to the field of delivery systems, and more particularly to a cognitive, drone-controlled, delivery system.

A drone, or a delivery drone, is an aircraft without a human pilot aboard (unmanned aerial vehicle). The drone may be controlled by a ground-based controller having a system of communications between the drone and the ground-based controller. The flight of a drone may operate autonomously using the onboard computers and the ground-based controller that are utilized to transfer packages from a warehouse to a client.

Cognitive computing systems are systems configured to simulate the human thought process in a computerized model. A cognitive computing system mimics functions of the human, such as human senses and human behavior. A cognitive computing system leverages various technological advancements such as, machine learning, reasoning, and image processing in order to improve or substitute for human decision making.

SUMMARY

According to one embodiment, a method, computer system, and computer program product for secure access package delivery by a drone having an access device is provided. The present invention may receive a plurality of unlock instructions based on determining a location is secured from access by the drone. The present invention may use the plurality of received unlock instructions to access the location with an access device while determining the drone is present at the secured location. The present invention may use the plurality of received unlock instructions to re-secure the location with the access device when determining successful delivery of a package by the drone, and may monitor a security of the location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a cognitive, drone-controlled, delivery system. The following described exemplary embodiments provide a system, method, and program product to, among other things, identify that the preferred delivery option is drone delivery, receive unlock instructions and, after identifying a drop off location, using the unlock instructions to access the drop off location. Therefore, the present embodiment has the capacity to improve the technical field of drone delivery system by using an access code to unlock the drop off location before the delivery and lock the drop off location after the delivery.

As previously described, a drone, or a delivery drone, is an aircraft without a human pilot aboard (unmanned aerial vehicle). The drone may be controlled by a ground-based controller having a system of communications between the drone and the ground-based controller. The flight of a drone may operate autonomously using the onboard computers and the ground-based controller that are utilized to transfer packages from a warehouse to a client.

On-line ordering of goods has passed a traditional, in-store purchasing volume and continues to increase annually. Transition to drone package delivery may be faster and more cost effective than human package delivery because the delivery is provided over the air and does not include labor costs. However, drone package delivery introduces new challenges, such as theft after delivery to a specified location. As such, it may be advantageous to, among other things, implement a cognitive drone control system having the ability to unlock a secured location, such as unlock and open a garage door, or an electronic window with an automated opening using any known technique, such as using Wi-Fi, radio frequency (RF), or any other way to digitally unlock and open the secured drop off location, deliver the package to a drop off location, and re-secure the location after successful delivery.

According to one embodiment, a secure access package delivery program may identify that a user has requested package delivery by drone, and request a user to provide unlock instruction to access the drop off location, such as a garage, an automatic door or window of a house of the user. When the drone identifies the drop off location, the drop off location may be unlocked and photographic evidence that the drop off location has been accessed may be transmitted to the user. Once package delivery is complete, the drop off location may be re-secured and additional photographic evidence may be captured as a proof of the re-secured drop off location. For example, a first photograph may be taken showing the package and the environment and the second photograph may be taken showing a closed garage door after the delivery.

The present invention may be a system, a method, and/or a computer program product at any possible technical detail level of integration. The computer program product may include a computer readable storage medium (or media) having computer readable program instructions thereon for causing a processor to carry out processor-implemented aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a preferred delivery option is drone delivery, receive unlock instructions for a drop off location, utilizing the received unlock instructions to access the drop off location, and re-lock the drop off location after package delivery.

Figure 1:
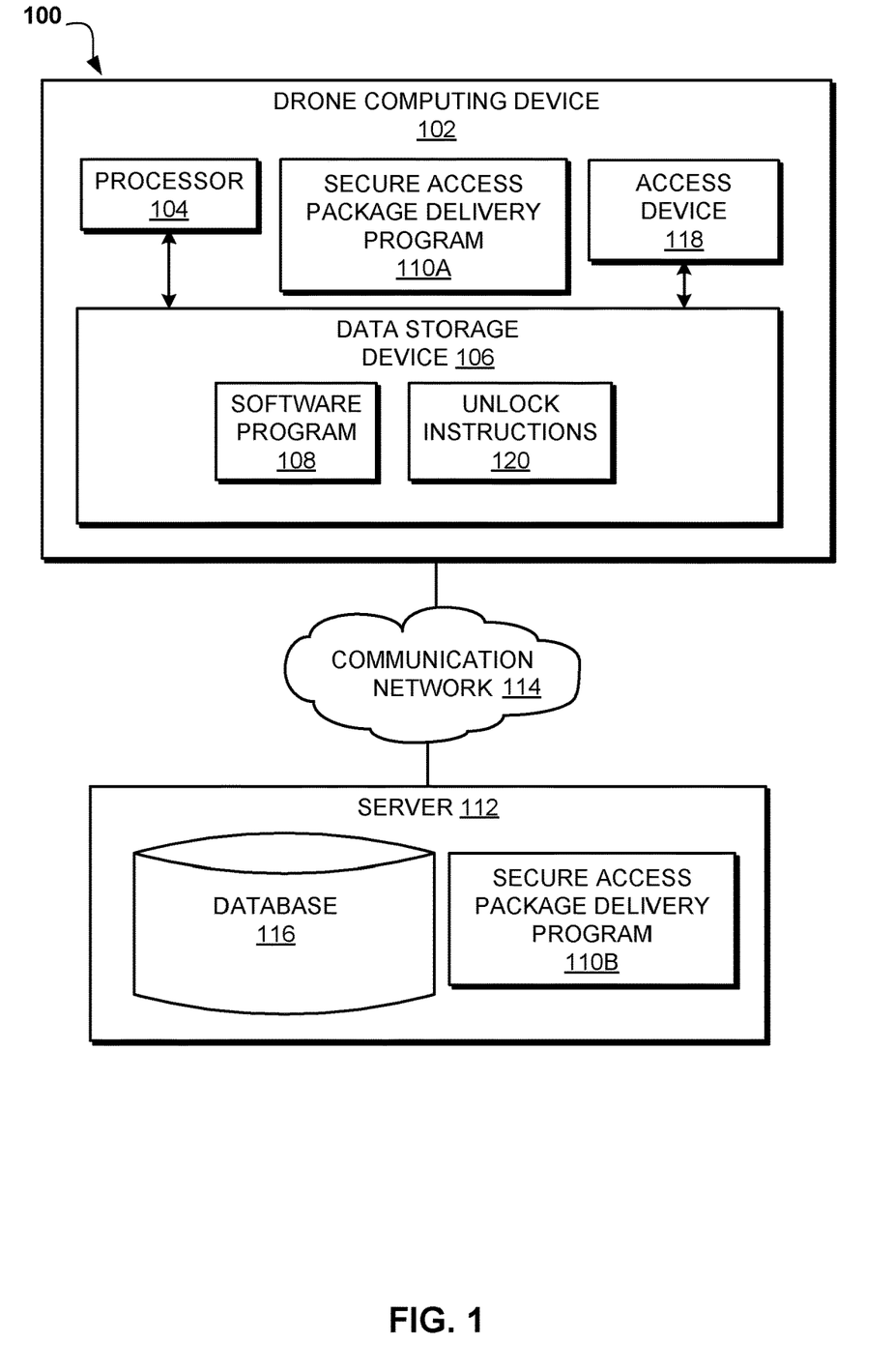
FIG. 1 illustrates an exemplary networked computer environment according to at least one embodiment.

Referring to FIG. 1, an exemplary networked computer environment 100 is depicted, according to at least one embodiment. The networked computer environment 100 may include drone computing device 102 and a server 112 interconnected via a communication network 114. According to at least one implementation, the networked computer environment 100 may include a plurality of drone computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Drone computing device 102 may include a processor 104, access device 118 and a data storage device 106 that is enabled to host and run a software program 108 and a secure access package delivery program 110A and communicate with the server 112 via the communication network 114, in accordance with one embodiment of the invention. Drone computing device 102 may be, for example, a mobile device, a microcontroller, or any type of computing device capable of running a program and accessing a network. As will be discussed with reference to FIG. 3, the drone computing device 102 may include internal components 302a and external components 304a, respectively.

The access device 118, may be any device or a combination of devices used when securely accessing a secured location. For example, access device 118 may be a transponder configured to unlock and re-lock a secured location if a corresponding code is provided, such as a radio frequency (RF) transponder, an Infra-Red (IR) transponder, a Wi-Fi transponder, a Bluetooth transponder and receiver or a combination of the aforementioned transmitters and receivers.

The server computer 112 may be a laptop computer, netbook computer, personal computer (PC), a desktop computer, or any programmable electronic device or any network of programmable electronic devices capable of hosting and running a secure access package delivery program 110B and a database 116 and communicating with the drone computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the secure access package delivery program 110A, 110B may be a program capable of identifying that a user-requested package be delivered by drone, request from a user to provide unlocking instructions to access a drop off location. When the drone identifies the drop off location, the secure access package delivery program 110A, 110B may unlock the drop off location, transfer photographic evidence that the drop off location is accessed, re-lock the drop off location, and capture additional photographic evidence that the drop off location is secured after package delivery. The secure access package delivery method is explained in further detail below with respect to FIG. 2.

Figure 2:
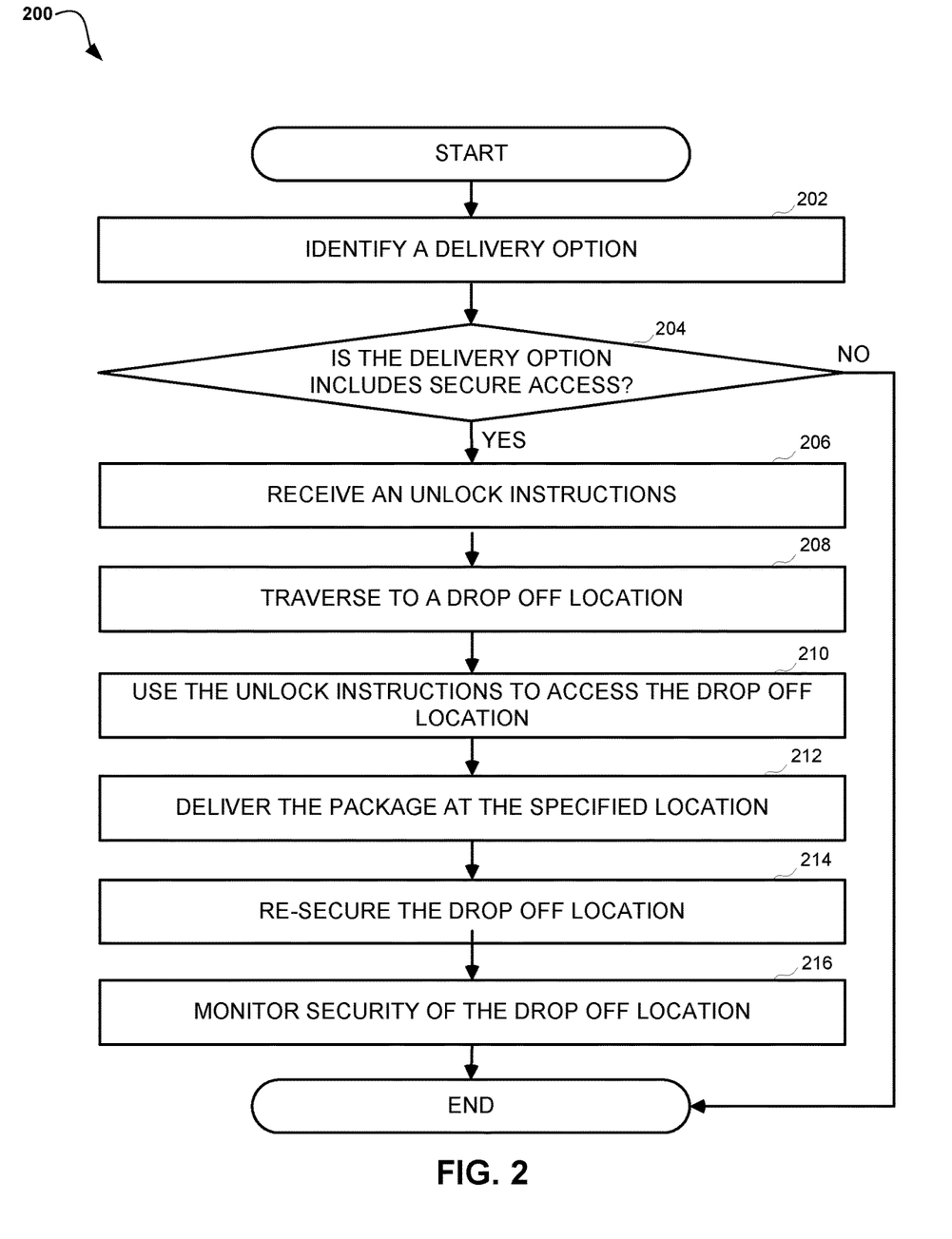
FIG. 2 is an operational flowchart illustrating a secure access package delivery process according to at least one embodiment.

Referring now to FIG. 2, an operational flowchart illustrating a secure access package delivery process 200 is depicted according to at least one embodiment. At 202, the secure access package delivery program 110A, 110B identifies a delivery option. According to at least one embodiment, during the purchasing process, a user may specify different methods of package delivery, such as mail delivery, self-pick up or delivery via drone. When a user chooses delivery via drone as the preferred delivery method, the secure access package delivery program 110A, 110B may identify that the user prefers the delivery via drone. For example, every time a user chooses a drone delivery (using a graphical user interface), a binary flag may be activated and the secure access package delivery program 110A, 110B may identify that the user desires a delivery via drone by checking the flag.

Then, at 204, the secure access package delivery program 110A, 110B determines whether the delivery option includes secure access. According to at least one embodiment, during a purchase order, when a user chooses delivery via drone, a graphical user interface may request a user provide a secure access drop off location. For example, a user may choose a garage as a secure location and provide an RF access code that opens the garage door. If the secure access package delivery program 110A, 110B determines that the delivery option includes a secure access drop off location (step 204, "YES" branch), the secure access package delivery program 110A, 110B may continue to step 206 to receive unlocking instructions. If the secure access package delivery program 110A, 110B determines no secure access option (step 204, "NO" branch), the secure access package delivery program 110A, 110B may terminate.

Next, at 206, the secure access package delivery program 110A, 110B receives unlock instructions. According to at least one embodiment, the secure access package delivery program 110A, 110B may request that a user provides an access code for the access device 118 and stores the instructions in unlock instructions 120. For example, if a user requests that the package be delivered into a garage having a garage door the user may provide an access code that may be used by an RF device associated with the access device 118 in the drone computing device 102. In another embodiment, a user may provide a Wi-Fi access code so that the drone delivery device 102, using the access device 118, may log in and open the secure drop off location.

Next, at 208, the secure access package delivery program 110A, 110B traverses to a drop off location. According to at least one embodiment, the secure access package delivery program 110A, 110B may traverse to the drop off location using GPS coordinates or other global positioning system coordinates, such as by using a wireless antenna triangulation approach or using an access device 118. In another embodiment, when traversing to a drop off location, the secure access package delivery program 110A, 110B may determine an exact drop off location by using video recognition software to identify the secure location, such as a garage door or an automatic window. In another embodiment, the secure access package delivery program 110A, 110B may traverse to the drop off location using the access device 118. For example, if the access device 118 may communicate with the receiver of the garage door is an identification that the drone is at the drop off location.

Next, at 210, the secure access package delivery program 110A, 110B uses the unlock instructions to access the drop off location. According to at least one embodiment, the secure access package delivery program 110A, 110B may use the unlock instructions 120 to unlock the drop off location by sending the unlock instructions 120 to the access device 118. For example, the unlock instructions 120 may include Wi-Fi access instructions that allow for the opening of a garage door via Wi-Fi, therefore the secure access package delivery program 110A, 110B may connect to the network using the instructions via the access device 118 and open the secured drop off location.

Next, at 212, the secure access package delivery program 110A, 110B delivers the package at the specified location. For example, if the specified location is a garage floor, the 110A, 110B may instruct the drone deliver device to place the package on a free available surface of the floor in the garage before releasing a mechanism that secures the package to the drone deliver device. According to at least one embodiment, the secure access package delivery program 110A, 110B may record photographic evidence of the package delivery (e.g., capturing a photograph or video) before leaving the package as a proof that the package was delivered to the destination. The destination may be identified using one or more cameras or RF sensors that may be installed on the drone. For example, a person may place a special physical mark on a floor or the table such as printed paper with a barcode that is recognizable by the secure access package delivery program 110A, 110B as a drop off destination.

Next, at 214, the secure access package delivery program 110A, 110B re-secures the drop off location. According to at least one embodiment, the secure access package delivery program 110A, 110B may use the unlock instructions 120 and access device 118 to lock the drop off location after successful delivery of the package. In another embodiment, the secure access package delivery program 110A, 110B may capture additional photographic evidence as a proof that the drop off location was re-secured after the package delivery.

Next, at 216, the secure access package delivery program 110A, 110B monitors security of the drop off location. According to at least one embodiment, the secure access package delivery program 110A, 110B may send the photographic evidence taken by the drone computing device 102 before and after delivery of the package. In another embodiment, the secure access package delivery program 110A, 110B may, using the access device 118, monitor whether the same unlock instructions are used after the delivery by a third party to assure that the third party did not maliciously intercept the unlock instructions and notifies the server if the unlock instructions were intercepted.

It may be appreciated that FIG. 2 provides only an illustration of one implementation and does not imply any limitations with regard to how different embodiments may be implemented. Many modifications to the depicted environments may be made based on design and implementation requirements.

Figure 3:
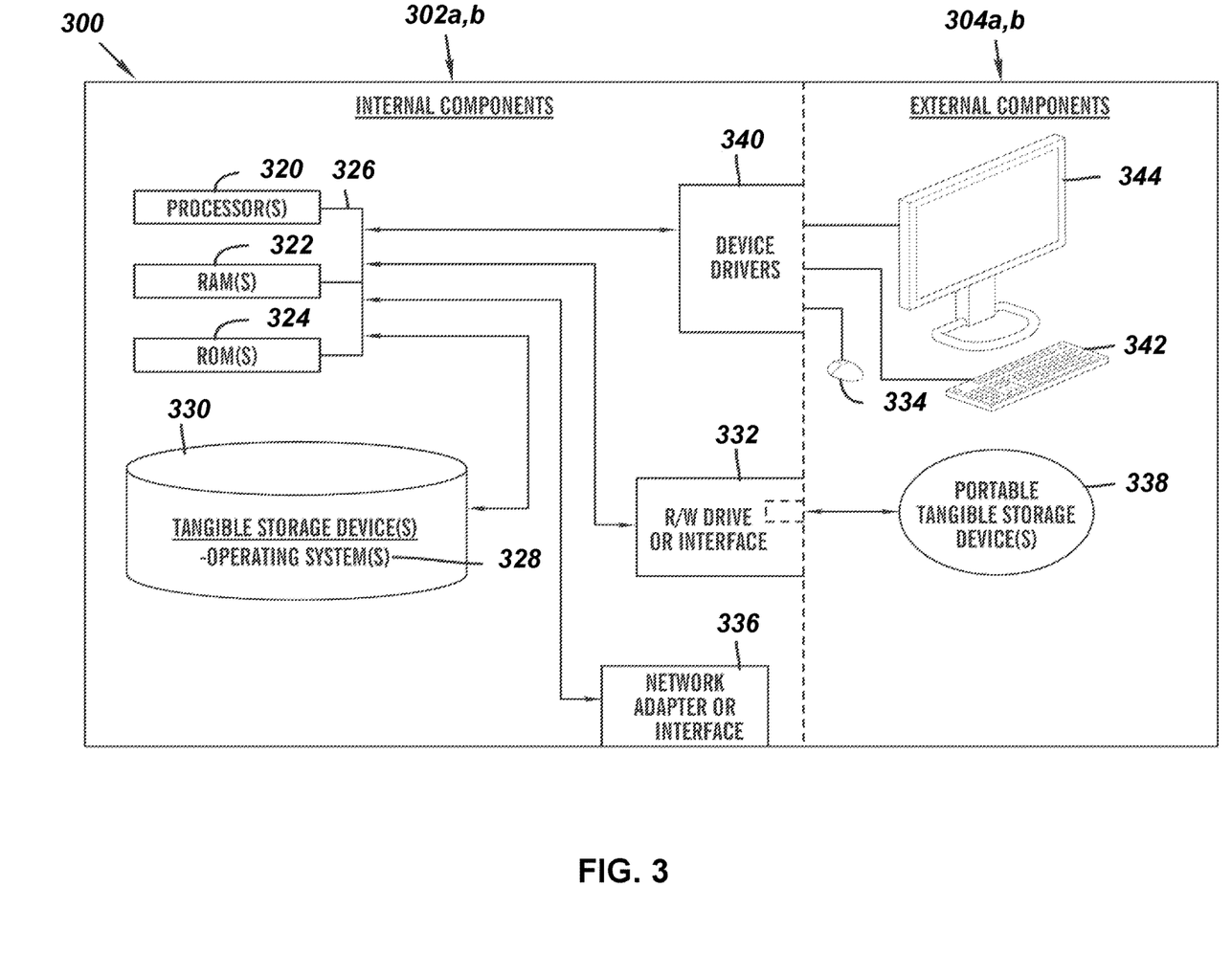
FIG. 3 is a block diagram of internal and external components of computers and servers depicted in FIG. 1 according to at least one embodiment.

FIG. 3 is a block diagram 300 of internal and external components of the drone computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The drone computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the secure access package delivery program 110A in the drone computing device 102, and the secure access package delivery program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the secure access package delivery 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the secure access package delivery program 110A in the drone computing device 102 and the secure access package delivery program 110B in the server 112 can be downloaded to the drone computing device 102 and the server 112 from an external computer via a network (for example, the Internet, a local area network or other, wide area network) and respective network adapters or interfaces 336. From the network adapters or interfaces 336, the software program 108 and the secure access package delivery program 110A in the drone computing device 102 and the secure access package delivery program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices.

Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
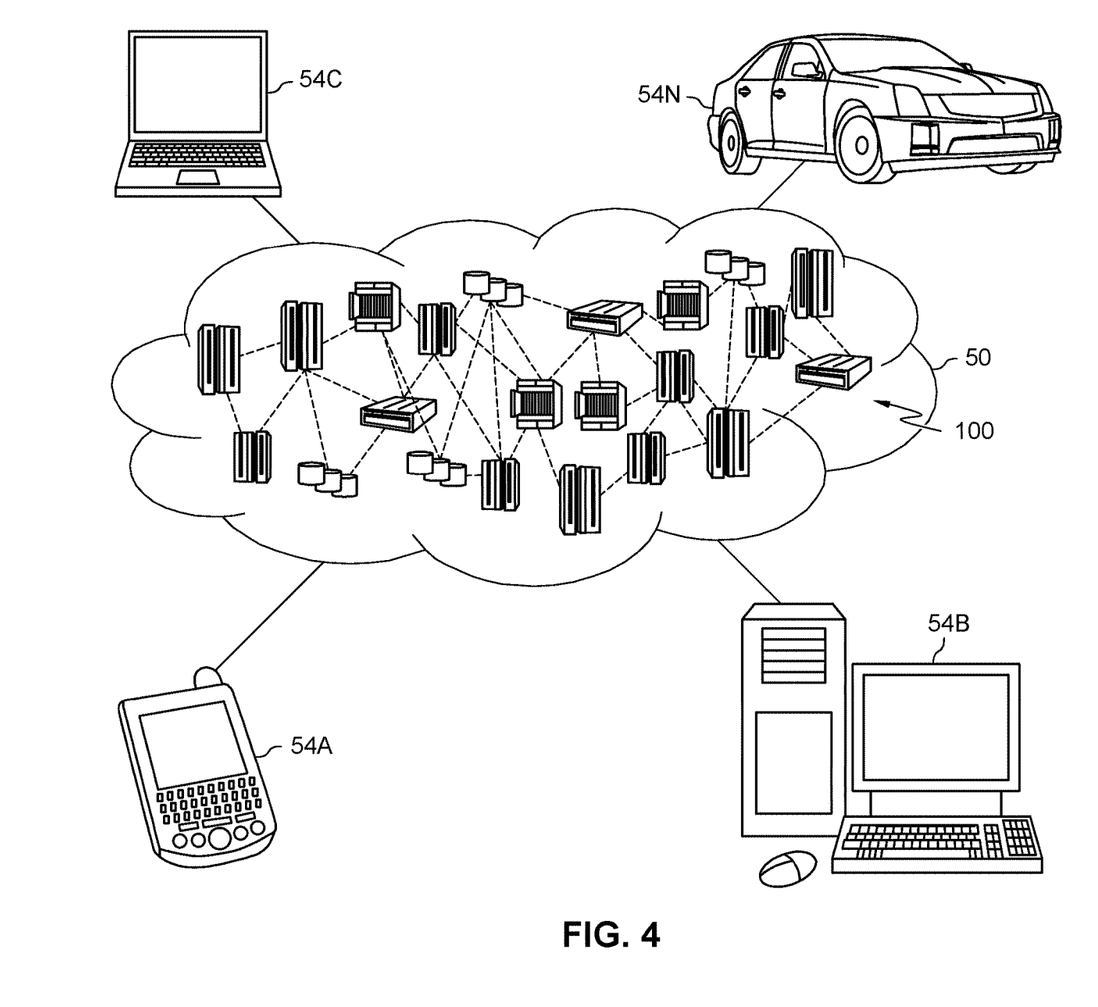
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
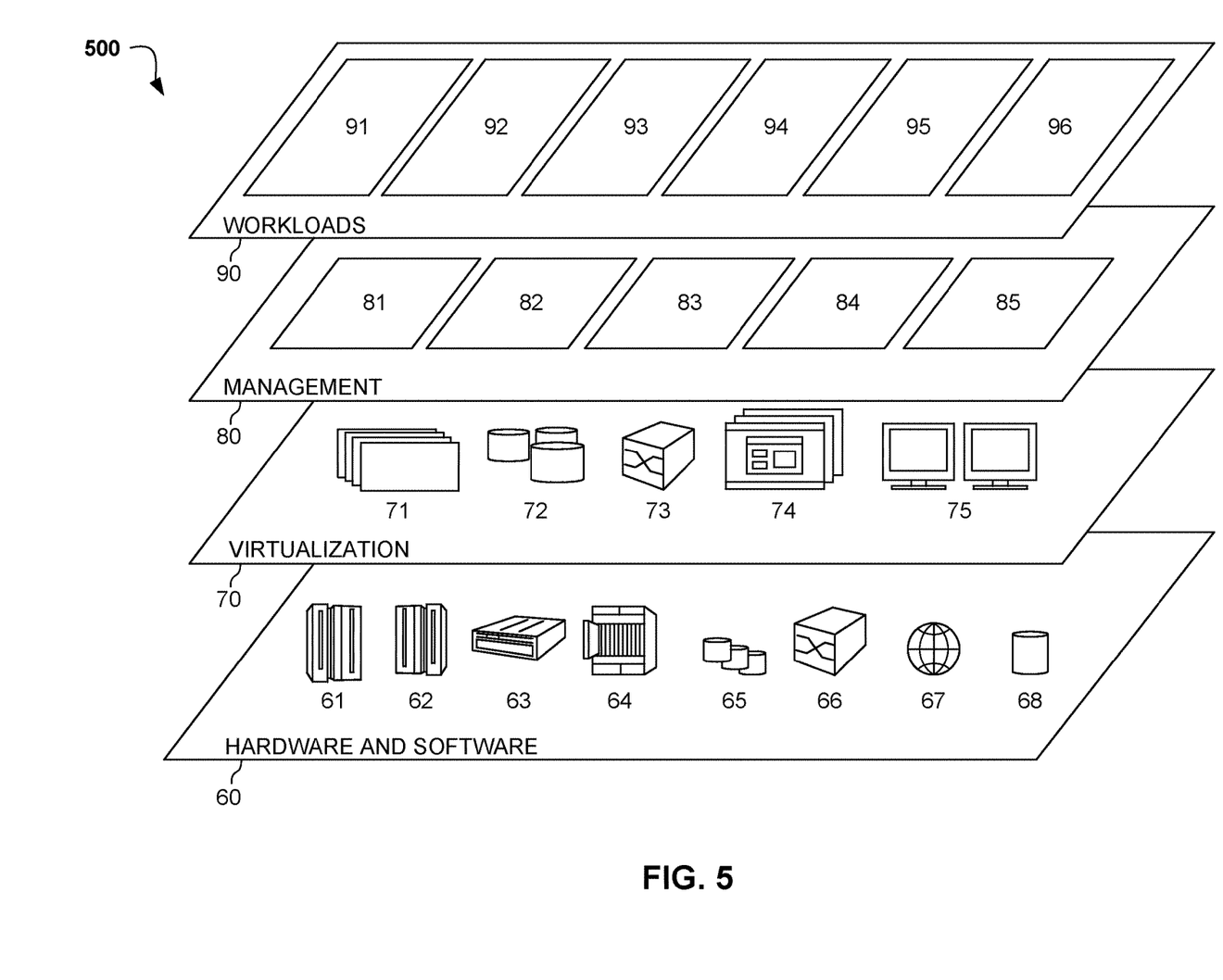
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure package delivery 96. Secure package delivery 96 may relate to delivering a package to a secure drop off location that allows a drone computing device to access the secure drop off location through the use of user-provided access information and re-secure the drop off location upon successful delivery of the package.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for secure access package delivery, the method comprising:

receiving a plurality of unlock instructions based on determining a drop off location is secured from access by a drone, wherein the drone having a camera and an access device, wherein the access device comprises a transponder to access the drop off location, wherein the access device is selected from a group consisting of a radio frequency transponder, an Infra-Red transponder, a Bluetooth transponder, and a Wi-Fi transponder, and wherein the drop off location that is secured from access comprises a door that is present at the location with a receiver that opens the door when the plurality of unlock instructions are received by the receiver;

based on determining using a video recognition software that the drone is present at the drop off location, using the plurality of received unlock instructions to access the drop off location with the access device, wherein determining that the drone is present at the drop off location is based on determining a presence of a barcode at the drop off location, and wherein the barcode represents a package release location;

based on determining successful delivery of a package by the drone:
 recording, by the camera, a photographic evidence of the successful delivery of the package;
 using the plurality of the received unlock instructions to re-secure the location with the access device;
 capturing, by the camera, an additional photographic evidence as a proof that the drop off location was re-secured after the successful delivery of the package; and
 sending the photographic evidence and the additional photographic evidence to a server using a communication network;

monitoring, with the access device, that the plurality of unlock instructions are not used by a third party, and wherein the third party maliciously intercepted the plurality of unlock instructions during unlocking the drop off location with the access device; and notifying a server when the third party maliciously intercepted the plurality of unlock instructions.

2. The method of claim 1, wherein the plurality of unlock instructions is a code that is used by the access device to wirelessly unlock the drop off location.

3. A computer system for secure access package delivery for a drone having an access device, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a plurality of unlock instructions based on determining a drop off location is secured from access by a drone, wherein the drone having a camera and an access device, wherein the access device comprises a transponder to access the drop off location, wherein the access device is selected from a group consisting of a radio frequency transponder, an Infra-Red transponder, a Bluetooth transponder, and a Wi-Fi transponder, and wherein the drop off location that is secured from access comprises a door that is present at the location with a receiver that opens the door when the plurality of unlock instructions are received by the receiver;

based on determining using a video recognition software that the drone is present at the drop off location, using the plurality of received unlock instructions to access the drop off location with the access device, wherein determining that the drone is present at the drop off location is based on determining a presence of a barcode at the drop off location, and wherein the barcode represents a package release location;

based on determining successful delivery of a package by the drone:
- recording, by the camera, a photographic evidence of the successful delivery of the package;
- using the plurality of the received unlock instructions to re-secure the location with the access device;
- capturing, by the camera, an additional photographic evidence as a proof that the drop off location was re-secured after the successful delivery of the package; and
- sending the photographic evidence and the additional photographic evidence to a server using a communication network;

monitoring, with the access device, that the plurality of unlock instructions are not used by a third party, and wherein the third party maliciously intercepted the plurality of unlock instructions during unlocking the drop off location with the access device; and notifying a server when the third party maliciously intercepted the plurality of unlock instructions.

4. The computer system of claim 3, wherein the plurality of unlock instructions is a code that is used by the access device to wirelessly unlock the drop off location.

5. A computer program product for secure access package delivery for a drone having an access device, the computer program product comprising:
- one or more computer-readable tangible storage medium and program instructions stored on at least one of the one or more tangible storage medium, the program instructions executable by a processor, the program instructions comprising:
- program instructions to receive a plurality of unlock instructions based on determining a drop off location is secured from access by a drone, wherein the drone having a camera and an access device, wherein the access device comprises a transponder to access the drop off location, wherein the access device is selected from a group consisting of a radio frequency transponder, an Infra-Red transponder, a Bluetooth transponder, and a Wi-Fi transponder, and wherein the drop off location that is secured from access comprises a door that is present at the location with a receiver that opens the door when the plurality of unlock instructions are received by the receiver;
- based on determining using a video recognition software that the drone is present at the drop off location, program instructions to use the plurality of received unlock instructions to access the drop off location with the access device, wherein determining that the drone is present at the drop off location is based on determining a presence of a barcode at the drop off location, and wherein the presence of the barcode represents a package release location;
- based on determining successful delivery of a package by the drone:
  - program instructions to record, by the camera, a photographic evidence of the successful delivery of the package;
  - program instructions to use the plurality of the received unlock instructions to re-secure the location with the access device;
  - program instructions to capture, by the camera, an additional photographic evidence as a proof that the drop off location was re-secured after the successful delivery of the package; and
  - program instructions to send the photographic evidence and the additional photographic evidence to a server using a communication network;
- program instructions to monitor, with the access device, that the plurality of unlock instructions are not used by a third party, and wherein the third party maliciously intercepted the plurality of unlock instructions during unlocking the drop off location with the access device; and
- program instructions to notify a server when the third party maliciously intercepted the plurality of unlock instructions.

6. The computer program product of claim 5, wherein the plurality of unlock instructions is a code that is used by the access device to wirelessly unlock the drop off location.

* * * * *